July 24, 1962      A. J. CLARKE      3,045,727
JIG FOR DRILLING DOWEL HOLES
Filed Feb. 11, 1960      2 Sheets-Sheet 1
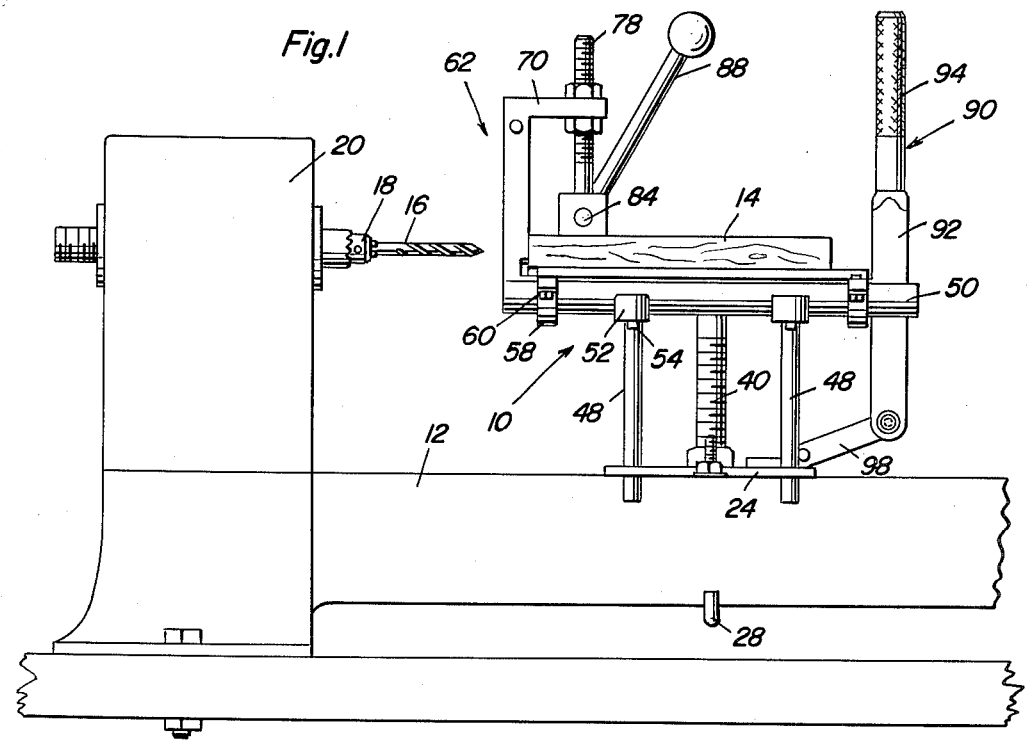
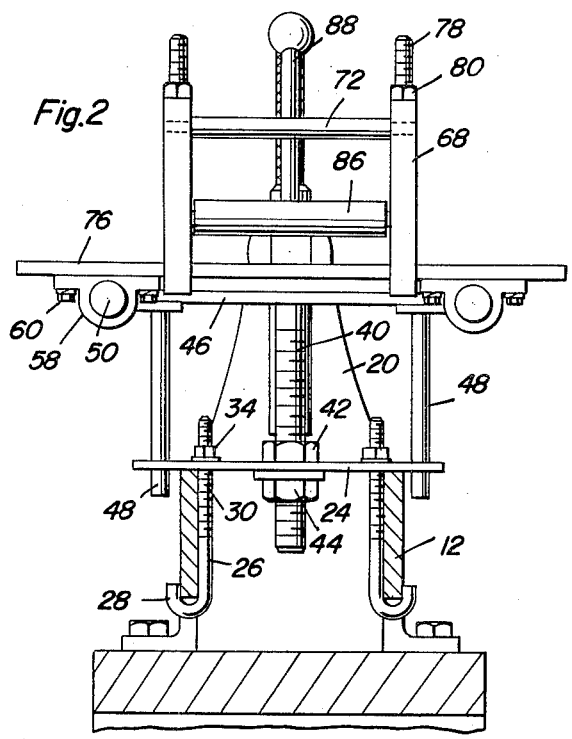
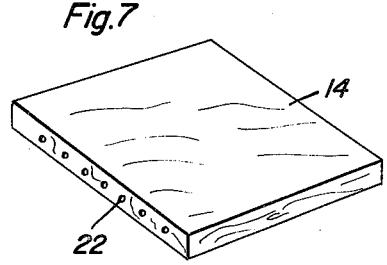
Albert J. Clarke
INVENTOR.

July 24, 1962  A. J. CLARKE  3,045,727
JIG FOR DRILLING DOWEL HOLES
Filed Feb. 11, 1960  2 Sheets-Sheet 2
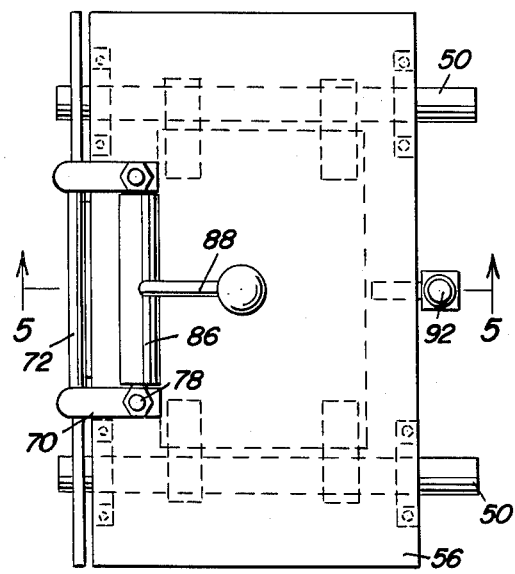
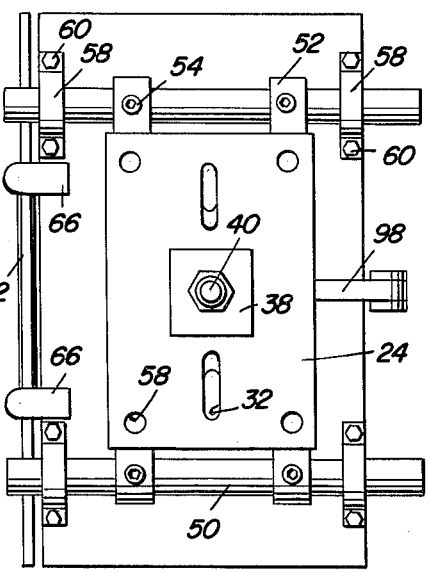
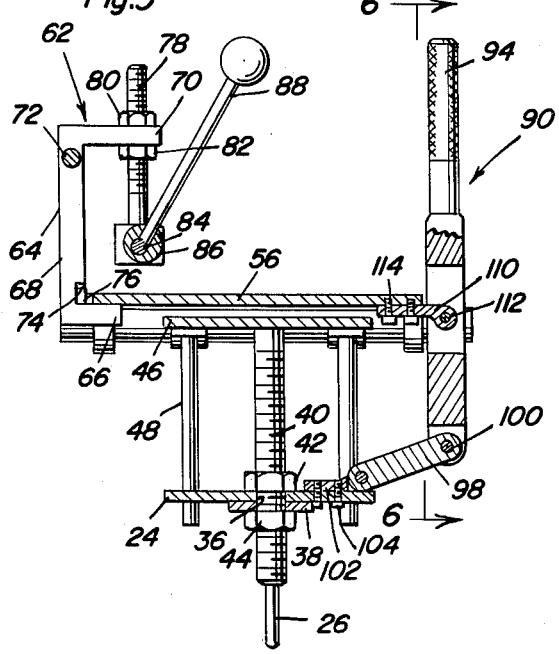
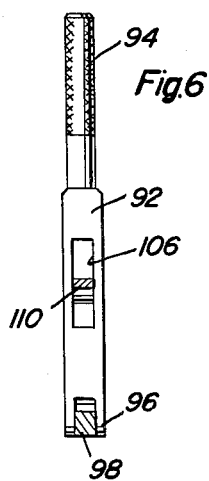
Albert J. Clarke
INVENTOR.

[United States Patent Office — 3,045,727 — Patented July 24, 1962]

3,045,727
JIG FOR DRILLING DOWEL HOLES
Albert J. Clarke, 2318 Hermitage Ave., Silver Spring, Md.
Filed Feb. 11, 1960, Ser. No. 8,115
5 Claims. (Cl. 144—92)

The present invention generally relates to work holding devices and more particularly to such a device in the form of a jig detachably mounted on lathe ways for retaining work in which dowel holes are to be formed by a drill carried by the chuck in the head of the lathe.

The primary object of the present invention is to provide a jig for holding work while drilling dowel holes therein in which the jig includes means for quickly and securely clamping and releasing the work involved together with a novel mechanism for moving the clamping mechanism longitudinally in relation to a drill for bringing the work into engagement with the drill for forming a dowel hole therein.

Another object of the present invention is to provide a jig in accordance with the preceding object in which the clamping mechanism and the work are moved in a path parallel to the rotational axis of the drill and with the surface of the work facing the drill arranged in a predetermined angular relation to the drill such as perpendicular to the longitudinal axis thereof.

A further object of the present invention is to provide a work holding jig in accordance with the preceding objects having a novel mechanism for attaching the jig to the lathe ways and incorporating in its construction means for vertically adjusting the work holding mechanism and the mechanism for sliding the work holding mechanism towards and away from the longitudinally stationary but rotatable drill.

Yet another feature of the present invention is to provide a jig for holding work while drilling dowel holes or the like therein which is simple in construction, easy to use, easy to install on a lathe bed, efficient in operation, safe, long lasting and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the jig of the present invention mounted on the lathe ways and holding work in position for engagement with a stationary hand rotatable drill;

FIGURE 2 is an end view of the jig of the present invention as taken from the head of the lathe with the lathe ways being illustrated in section;

FIGURE 3 is a top plan view of the jig;

FIGURE 4 is a bottom plan view of the jig;

FIGURE 5 is a longitudinal, sectional view taken substantially upon a plane passing along section line 5—5 of FIGURE 3 illustrating further structural details of the present invention;

FIGURE 6 is a detailed sectional view taken substantially upon a plane passing along section line 6—6 of FIGURE 5 illustrating the details of the operating handle for sliding the work and the work clamping mechanism longitudinally in relation to the rotational axis of the drill; and FIGURE 7 is a perspective view of a piece of work illustrating dowel holes formed therein.

Referring now specifically to the drawings, the numeral 10 generally designates the jig of the present invention which is mounted on a pair of stationary lathe ways 12 for holding a piece of work 14 for movement towards and away from a rotatable drill 16 carried by a chuck 18 rotatably supported by the head 20 of the lathe with the chuck 18 and drill 16 being rotatably driven by any suitable means. The details of the lathe form no part of the present invention and is illustrated merely to exemplify the use and orientation of the present invention when being used for forming dowel holes 22 in the piece of work 14 as illustrated in FIGURE 7 in which case the piece of work is generally a rectangular piece of wood.

The jig 10 includes a generally rectangular mounting plate 24 resting against the top surface of the lathe ways 12. Extending upwardly through the mounting plate 24 is a pair of J-bolts 26 having hook-shaped lower ends 28 engaging under the bottom edge of the respective lathe ways. The upper end of the J-bolts are threaded as indicated by numeral 30 and extend through slots 32 in the mounting plate 24. The upper ends of the threaded portions 30 receive clamping nuts 34 which rigidly secure the mounting plate 24 to the lathe ways 12 with the slots 32 and the elongated threaded portions 30 enabling the mounting plate 24 to be mounted on various shapes and sizes of lathe beds having different arrangements of ways 12.

The center of the mounting plate 24 is provided with an enlarged opening 36 with an apertured reinforcing plate 38 underlying the mounting plate 24. The apertured plate 38 may be in the form of a washer and an elongated threaded rod 40 extends through the aperture 36 and the apertured plate 38. A clamping nut 42 is disposed on the threaded rod 40 and engages the upper surface of the mounting plate 24 and a clamping nut 44 is disposed on the threaded rod 40 and engages the undersurface of the apertured plate or washer 38. The upper end of the rod 40 is rigidly affixed to a supporting plate 46 as by welding or the like with the threaded rod 40 forming an adjustment for varying the supporting plate 46 in relation to the mounting plate 24. Each corner of the supporting plate 46 is provided with a depending guide pin or rod 48 that is slidably received in corner apertures or openings 50 in the mounting plate 24 thereby guiding movement of the supporting plate 46 in relation to the mounting plate 24 for retaining these two plates in generally parallel relation. By manipulating the nuts 42 and 44 in a known manner, the supporting plate 46 may be raised or lowered in relation to the mounting plate 24.

The side edges of the supporting plate 46 are attached to a pair of parallel supporting or guiding rods 50 which are disposed in parallel relation to the mounting plate 24 and the supporting plate 46 and which are attached to the supporting plate 46 by brackets 52 and screw threaded fasteners 54 extending through the brackets into the respective guide rods 50. The elevational position of the guide rods 50 is changed in the same manner as the supporting plate 46 since they are rigidly secured thereto.

Disposed above the supporting plate 46 is a work carrying or holding plate 56 of generally rectangular configuration. The work carrying plate 56 is movably supported on the horizontal guide rods 50 by mounting and bearing brackets 58 slidably encircling the guide rods 50 and secured to the work holding or carrying plate 56 by fastening bolts 60 or the like. The bearing brackets 58 are disposed outwardly of the brackets 52 and will serve to limit the degree of sliding movement of the work holding plate 56 in relation to the supporting plate 46.

At the forward edge of the work carrying plate 56, a clamping mechanism is provided for the work 14 and the clamping mechanism is generally designated by reference numeral 62.

The clamping mechanism includes a pair of generally U-shaped members 64 each having a lower leg 66 extending under the forward edge of the work carrying plate 56. An upstanding bight portion 68 is connected to the lower leg 66 and is in perpendicular relation to the edge of the plate 56 and the upper leg 70 is disposed in parallel relation to and in overlying relation to the upper surface of the work carrying plate 56. A transverse rod 72 interconnects the upstanding bight portion 68 adjacent the upper end thereof for rigidifying this part of the clamp mechanism and adjacent the edge of the work carrying plate 56, each of the bight portions 68 is provided with a recess 74 in the edge thereof facing the work holding surface of the plate 56 for receiving an elongated member 76 in the form of a fence or abutment surface for the work 14 placed on the surface of the work carrying plate 56. One edge of the work 14 is disposed against the member 76 thus orientating the work in a predetermined relationship to the transverse member 76 which is disposed in perpendicular relation to the rotational axis of the drill 16. The clamping mechanism 62 may be secured to the plate 56 in any suitable manner such as by fastening bolts, welding or the like and the member 72 and the transverse member 76 may also be secured in any suitable manner.

Each inwardly extending leg 70 is provided with an externally threaded rod 78 having a pair of nuts 80 and 82 thereon engaging respectively the upper and lower surface of the leg 70. The lower ends of the threaded rods 78 support a shaft 84 that rotatably journals a cylindrical clamping member 86 that is mounted eccentrically on the shaft 84 and which is provided with a laterally extending operating handle 88 whereby the handle 88 may be swung in an arcuate manner to bring the cam-like gripping member 86 into engagement with the upper surface of the workpiece 14 for clamping the workpiece rigidly in position on the work carrying plate 56 for securely clamping the work in position while at the same time enabling the work to be easily and quickly released.

An operating mechanism generally designated by numeral 90 is provided for sliding the work carrying plate 56 and the clamp mechanism 62 in parallel relation to the rotational axis of the drill 16. This mechanism includes an elongated handle 92 having a knurled upper end 94 forming a hand grip and a bifurcated lower end 96 which pivotally receives a link 98 therebetween with a pivot pin 100 connecting the link to the bifurcated end 96 of the handle 92. The other end of the link 98 is received between the ears of a bifurcated bracket 102 that is secured to the edge of the mounting plate 24 by fastening members 104. Thus, the elongated handle 92 is articulately connected to the mounting plate 24 which is stationary by virtue of its attachment to the lathe ways 12.

Adjacent the center of the elongated handle 92, there is provided an aperture or opening 106 which receives therein a mounting bracket 110 that is connected to the handle 92 by virtue of a transverse pin 112. The bracket 110 is secured rigidly to the work carrying plate 56 by fastening bolts 114. Thus, as the hand grip 94 is pulled or pushed longitudinally in relation to the longitudinal axis of the drill 16, the work carrying plate 56 will be moved in a manner as guided by the guide rods 50. This assures that such movement will be parallel to the rotational axis of the drill and will enable the work to be moved positively inwardly towards the drill and positively outwardly from the drill thereby maintaining control of the work. The threaded rods 78 which support the eccentric clamp cam 86 may be adjusted for varying the device for different thicknesses of work while the adjustment feature formed by the threaded rod 40 and the nuts 42 and 44 enables the work to be elevated or lowered for alignment with the drill.

The entire structure of the device lends it readily adaptable for mass production procedures and will enable most persons to accurately form dowel holes without resorting to rather expensive automatic machinery.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may resorted to, falling within the scope of the invention as claimed.

What is claimed as new is as follows:

1. A jig for holding work while drilling dowel holes therein comprising a mounting plate adapted to be attached securely to lathe ways, a supporting plate vertically adjustably carried by the mounting plate in spaced parallel relation thereto, a work carrying plate mounted on the supporting plate for longitudinal movement in relation thereto, means on the work carrying plate for securing a workpiece thereon, and means interconnecting the mounting plate and the work carrying plate for moving the work carrying plate longitudinally in relation to the supporting plate and mounting plate, said mounting plate including a pair of adjustable J-bolts adjustably connected to the mounting plate for engagement with lathe ways.

2. A jig for holding work while drilling dowel holes therein comprising a mounting plate adapted to be attached securely to lathe ways, a supporting plate vertically adjustably carried by the mounting plate in spaced parallel relation thereto, a work carrying plate mounted on the supporting plate for longitudinal movement in relation thereto, means on the work carrying plate for securing a workpiece thereon, and means interconnecting the mounting plate and the work carrying plate for moving the work carrying plate longitudinally in relation to the supporting plate and mounting plate, said supporting plate including a rigid depending threaded rod extending through the mounting plate, upper and lower nuts on the threaded rod engageable with opposite surfaces of the mounting plate for adjusting the rod and the supporting plate vertically in relation to the mounting plate, said supporting plate having a plurality of depending guide pins, said mounting plate having apertures slidably receiving said pins for guiding the supporting plate when moved in relation to the mounting plate.

3. A jig for holding work while drilling dowel holes therein comprising a mounting plate adapted to be attached securely to lathe ways, a supporting plate vertically adjustably carried by the mounting plate in spaced parallel relation thereto, a work carrying plate mounted on the supporting plate for longitudinal movement in relation thereto, means on the work carrying plate for securing a workpiece thereon, and means interconnecting the mounting plate and the work carrying plate for moving the work carrying plate longitudinally in relation to the supporting plate and mounting plate, said means interconnecting the work carrying plate and the mounting plate including an elongated lever pivotally attached to the work carrying plate and extending thereabove, the upper end of the lever terminating in a hand grip for pivotal movement thereof, the lower end of the lever being pivotally connected to a link, said link being articulately connected to the mounting plate whereby the lower end of the lever is articulately connected to the mounting plate for imparting longitudinal movement to the work carrying plate upon swinging movement of the lever.

4. The combination of claim 3 wherein the work securing means includes a transverse fence mounting on said work carrying plate for limiting the movement and orientating the workpiece in relation to the work carrying plate.

5. The combination of claim 4 wherein said work securing means also includes a pivotal eccentric clamp member, means mounting said clamp member vertically adjustably in overlying relation to the surface of the work carrying plate in spaced relation to the edge thereof for clamping work onto the surface of the work carrying plate.

References Cited in the file of this patent

UNITED STATES PATENTS

| | | |
|---|---|---|
| 809,717 | Mong | Jan. 9, 1906 |
| 1,667,022 | Wood | Apr. 24, 1928 |
| 2,796,778 | Flores | June 25, 1957 |

FOREIGN PATENTS

| | | |
|---|---|---|
| 418,503 | Great Britain | Oct. 25, 1934 |